US012037233B2

(12) United States Patent
Godet

(10) Patent No.: US 12,037,233 B2
(45) Date of Patent: Jul. 16, 2024

(54) METHOD FOR FORMING A BOTTOM OF A PLASTIC CONTAINER, COMPRISING A STEP OF CHECKING THE INVERSION OF A DIAPHRAGM SITUATED AT THE BOTTOM OF THE CONTAINER

(71) Applicant: SIDEL PARTICIPATIONS, Octeville-sur-Mer (FR)

(72) Inventor: Florian Godet, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 344 days.

(21) Appl. No.: 17/423,809

(22) PCT Filed: Jan. 9, 2020

(86) PCT No.: PCT/FR2020/050030
§ 371 (c)(1),
(2) Date: Jul. 16, 2021

(87) PCT Pub. No.: WO2020/148494
PCT Pub. Date: Jul. 23, 2020

(65) Prior Publication Data

US 2022/0081275 A1 Mar. 17, 2022

(30) Foreign Application Priority Data

Jan. 17, 2019 (FR) ...................................... 1900408

(51) Int. Cl.
*B67C 3/22* (2006.01)
*B65D 79/00* (2006.01)

(52) U.S. Cl.
CPC ............ *B67C 3/22* (2013.01); *B65D 79/0081* (2020.05); *B67C 2003/226* (2013.01)

(58) Field of Classification Search
CPC . B67C 3/22; B67C 2003/226; B65D 79/0081; B65D 1/0276; B65B 61/24;
(Continued)

(56) References Cited

U.S. PATENT DOCUMENTS 9,296,539 B2 * 3/2016 Wright ............... B65D 79/0081
9,994,378 B2 * 6/2018 Wurster ............... B65D 1/0276
(Continued)

FOREIGN PATENT DOCUMENTS

DE 202015106722 U1 3/2017
EP 2990344 A1 3/2016

OTHER PUBLICATIONS

International search report dated Apr. 3, 2020.

*Primary Examiner* — Dariush Seif

(57) ABSTRACT

A method for forming, in an inversion device, a base of a filled and sealed plastic container, comprising a step of inverting a diaphragm situated at the center of the base of the container and surrounded by a standing ring forming a standing surface. During the step, two opposing pushing members are set in relative motion with respect to one another so as to come into contact with and press on two longitudinally opposed regions of the container. During a phase of pushing the diaphragm during the inversion thereof, there is sought, on a curve representative of the force applied to the diaphragm to move same during the inversion, a variation on this curve that indicates whether the forces applied by the pushing members to the regions with which they are in contact are becoming smaller.

17 Claims, 3 Drawing Sheets

(58) Field of Classification Search
CPC ................ B29C 49/12; B29C 49/4273; B29K 2067/003; B29L 2031/7158
See application file for complete search history.

(56) References Cited

U.S. PATENT DOCUMENTS

| | | | | |
|---|---|---|---|---|
| 10,053,276 | B2 * | 8/2018 | Godet | B65D 79/0081 |
| 10,059,482 | B2 * | 8/2018 | Mast | B29C 49/12 |
| 10,661,937 | B2 * | 5/2020 | Godet | B65D 79/0081 |
| 11,505,353 | B2 * | 11/2022 | Godet | B29C 49/4273 |
| 2013/0043202 | A1 * | 2/2013 | Wurster | B65D 1/0276 53/467 |
| 2015/0328825 | A1 * | 11/2015 | Bunel | B29B 11/14 264/535 |
| 2015/0352773 | A1 * | 12/2015 | Bunel | B65D 79/0081 425/522 |
| 2016/0059982 | A1 * | 3/2016 | Pace | B29C 67/0048 425/149 |
| 2016/0152457 | A1 * | 6/2016 | Godet | B67C 3/007 53/471 |
| 2016/0311599 | A1 * | 10/2016 | Stelzer | B65D 79/0081 |
| 2017/0113860 | A1 * | 4/2017 | Godet | B65D 79/0081 |
| 2017/0144817 | A1 * | 5/2017 | Godet | B65D 1/0276 |
| 2017/0239846 | A1 * | 8/2017 | Bunel | B29B 11/14 |
| 2017/0267392 | A1 * | 9/2017 | Woloszyk | B29C 49/12 |
| 2017/0362009 | A1 * | 12/2017 | Godet | B65D 1/0246 |
| 2018/0186498 | A1 * | 7/2018 | Godet | B67C 3/22 |
| 2020/0346809 | A1 * | 11/2020 | Godet | B65B 61/24 |
| 2021/0221593 | A1 * | 7/2021 | Lane | B65D 1/0276 |
| 2022/0081275 | A1 * | 3/2022 | Godet | B67C 3/007 |

* cited by examiner

[Fig. 1]
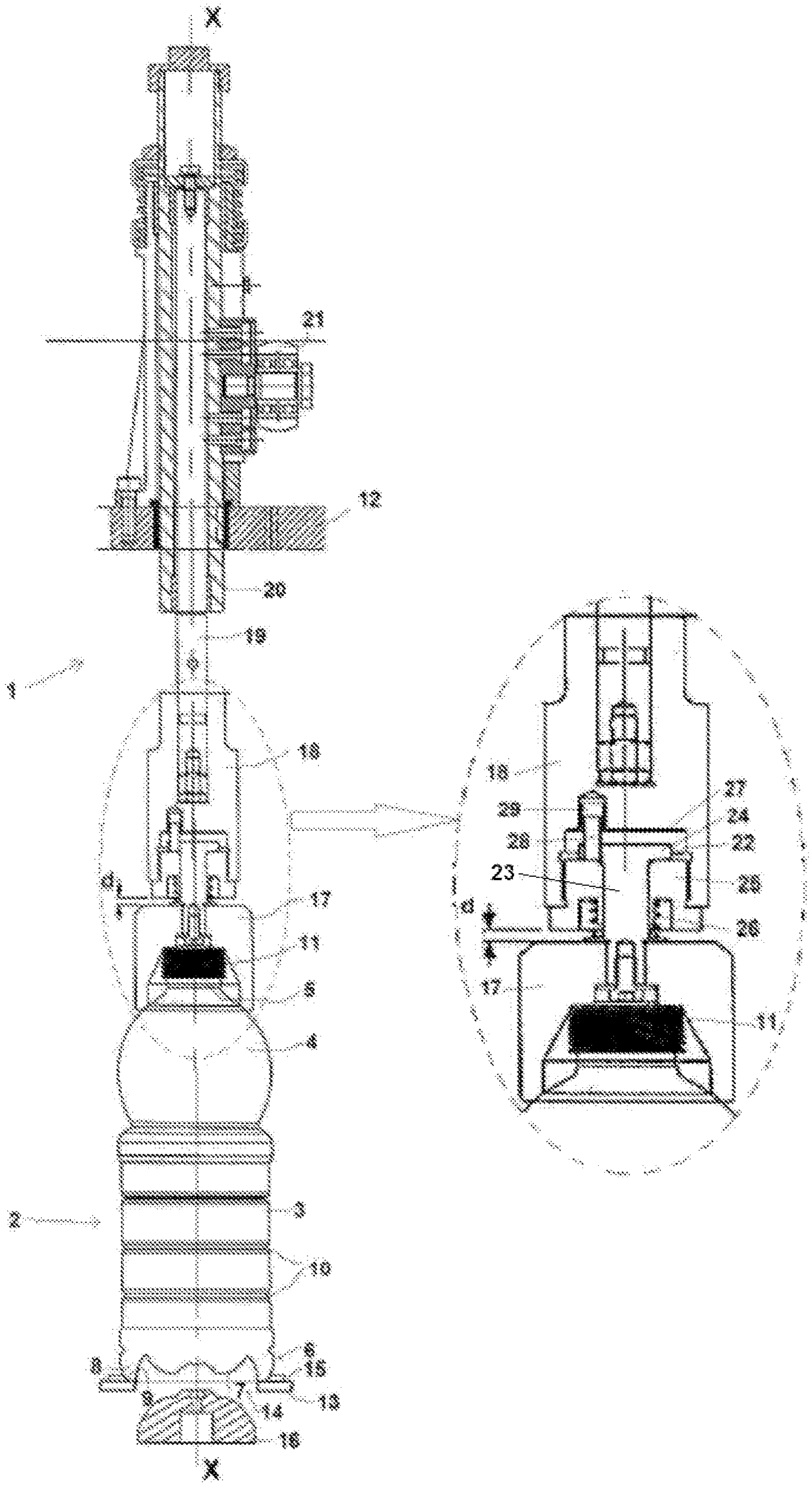

[Fig. 2]
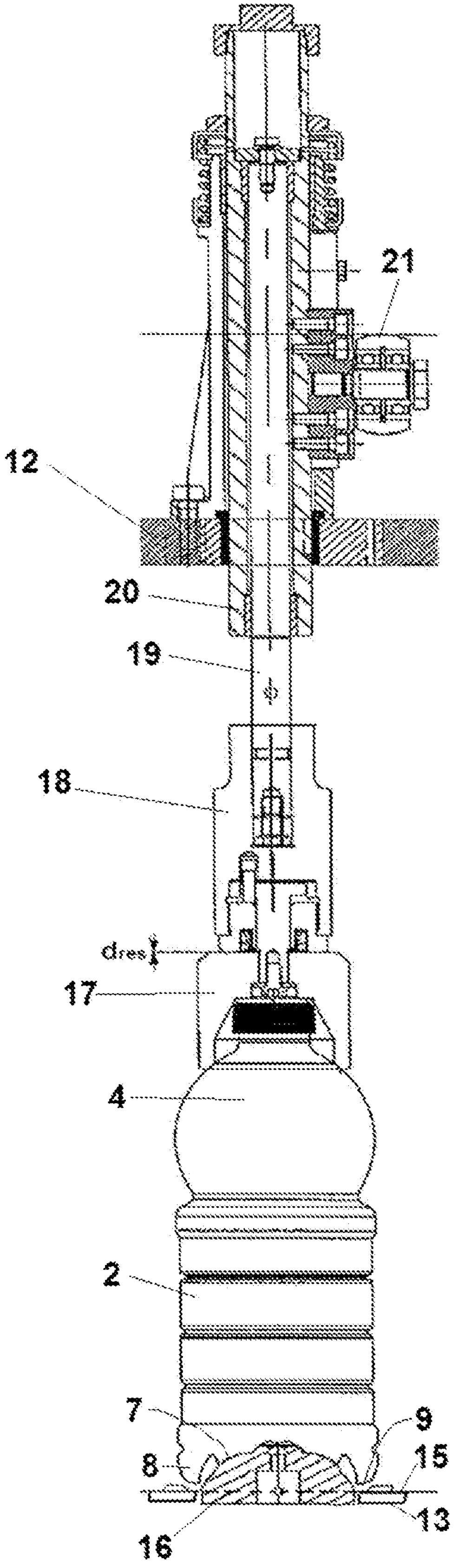
[Fig. 3]
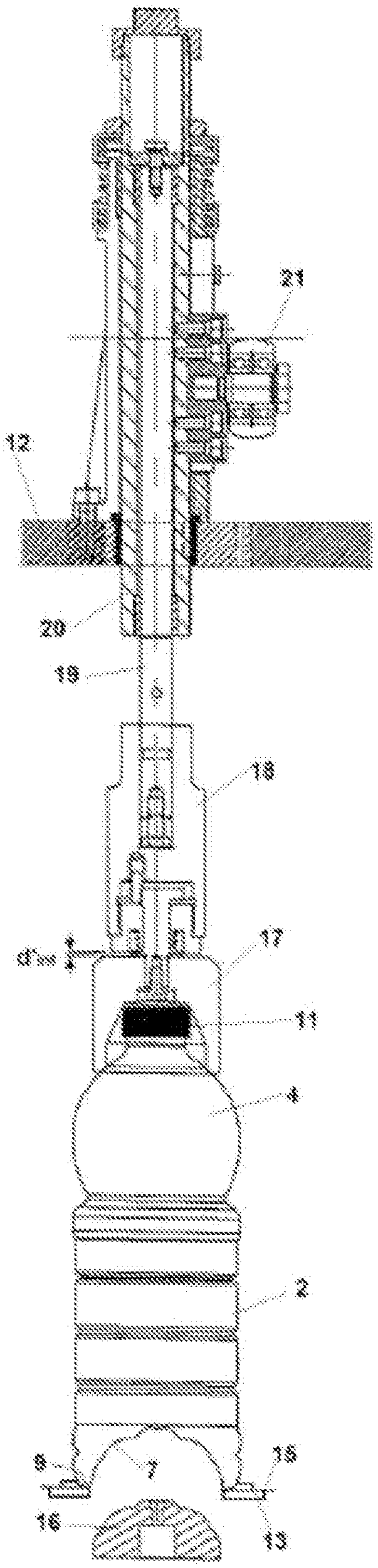

[Fig. 4]
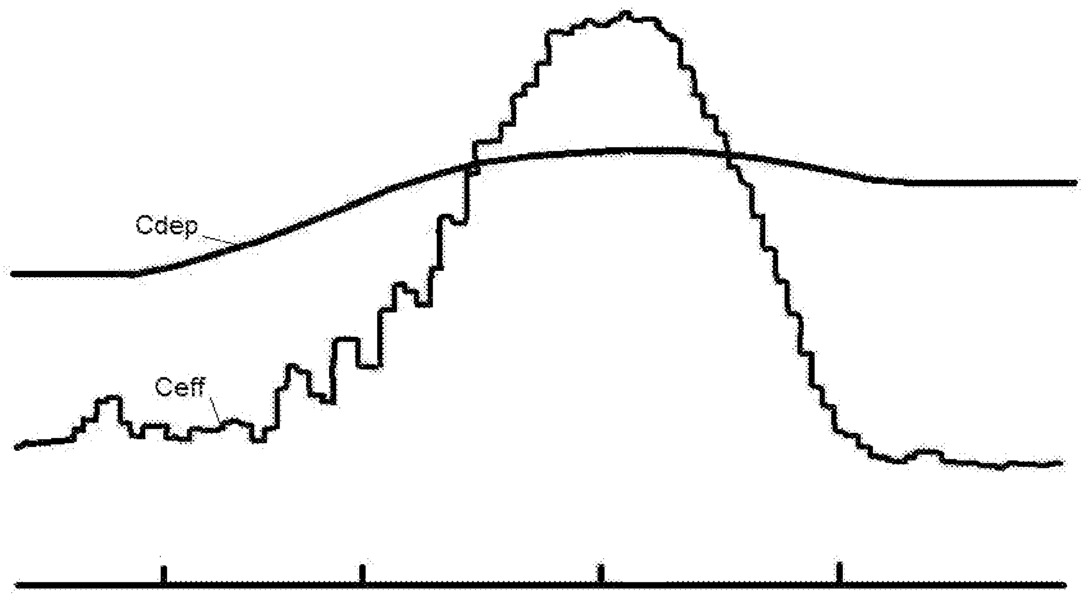
[Fig. 5]
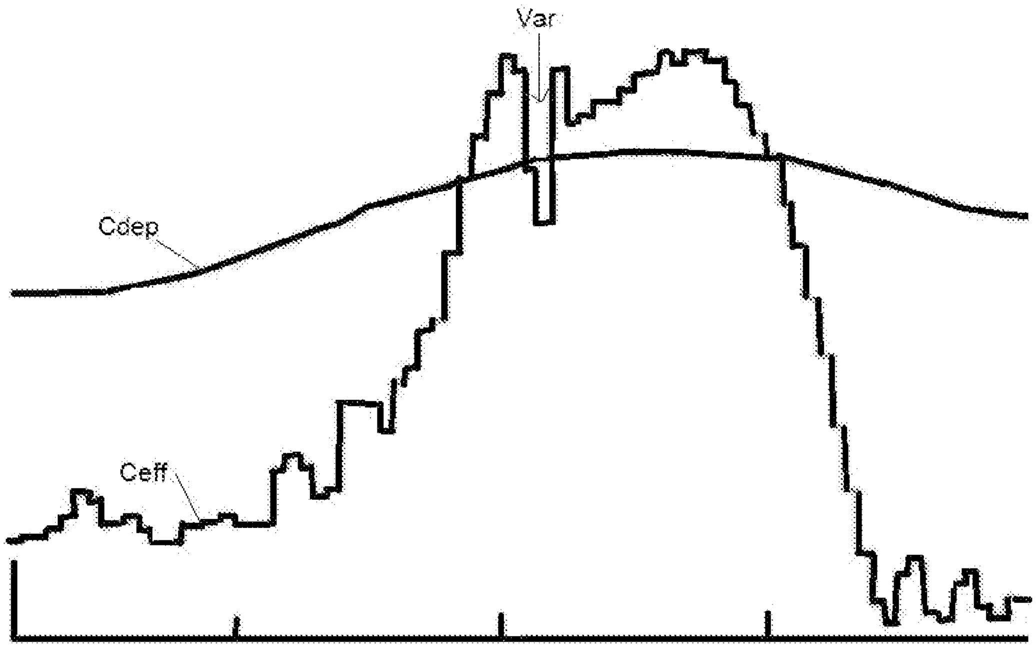

METHOD FOR FORMING A BOTTOM OF A PLASTIC CONTAINER, COMPRISING A STEP OF CHECKING THE INVERSION OF A DIAPHRAGM SITUATED AT THE BOTTOM OF THE CONTAINER

FIELD OF THE INVENTION

The subject matter of the invention is the manufacture of containers, such as bottles, which are obtained by blow-molding or stretch-blow-molding of preforms made of thermoplastic material (for example of PET). The invention applies more particularly although not exclusively to the handling of containers that are hot-filled with contents, notably liquid, and hot-sealed, the term "hot" signifying that the temperature of the contents is close to, or higher than, the glass transition temperature of the material of which the container is made. Typically, the hot-filling of containers made of PET, the glass transition temperature of which is of the order of 80° C., is performed with a liquid the temperature of which is comprised between 85° C. and 100° C.

BACKGROUND OF THE INVENTION

By way of preliminary comment, it is indicated that, in the remainder of the present description and in the claims, for the sake of simplification and unless indicated otherwise, the terms "top", "bottom", "vertical", "horizontal", "above", "below", "upper", "lower" and all other comparable terms are to be interpreted considering the container standing upright, namely with its standing ring placed on a horizontal standing surface. The vertical direction and the "longitudinal" axis of the container are, respectively, a direction and an axis that are vertical (and therefore perpendicular to the standing surface), this axis passing through the center of the base of the container.

It is known practice to produce a hot-fillable container in a mold heated to a temperature that exceeds that of the contents that will be placed in the container, and for the container, after it has been formed by blow-molding or stretch-blow-molding, to be kept in the mold for a significant length of time (of the order of several tenths of a second) so that contact between the container and the hot mold allows the stresses that arise in the material during forming to relax. Such manufacture in a hot mold has the effect of preventing the stress relaxation that follows the molding from occurring at the time of hot filling: indeed if the container were manufactured in a cold mold, it would soften at the time of filling, and deform in an uncontrolled fashion.

However, such manufacture is not enough to guarantee that a container, once completed and filled, will maintain its shape. Specifically, after filling and sealing (capping) while the contents are still hot, what happens during cooling is that the trapped air contracts (because it is cooling) and, to a lesser extent, the liquid contracts, thus causing a vacuum which causes the container to deform by the collapsing-in of its wall. The container may thus ovalize or deform in some other disordered manner, which may cause problems of handling or of esthetics.

In order to overcome these disadvantages, containers have therefore been designed in which the lateral wall or walls are provided with what are known as "pressure panels" (which perform a compensatory role) which have the purpose of absorbing the effects of the vacuum and of preventing disordered deformation of the containers as they cool. American patent U.S. Pat. No. 5,341,946 describes a container of this type.

However, the presence of the pressure panels limits the possibility, for the creators of containers, to obtain shapes that are distinct from one another, and this does not necessarily make marketing any easier. Furthermore, such containers are relative heavy and are therefore expensive because of the quantity of raw material they require.

In order to overcome the disadvantages of containers with pressure panels, both in terms of marketing and in terms of cost, containers have relatively recently been conceived in which the base is provided with an invertible central diaphragm surrounded by a region constituting the circular standing ring of the container, and the body of which is reinforced by peripheral ribs. The European patent application published under number EP3109177A1 in the name of the Applicant Company, presents a container of this type, which is lightened in comparison with the earlier containers having pressure panels.

According to that which is described in this application EP3109177A1, at the end of manufacture, the diaphragm is in the form of a bowl the concave side of which faces toward the inside of the container. The diaphragm is contained inside a ring ending in a peripheral standing ring. One benefit of the invention described in that application is that the ring has a height that is such that it entirely contains the diaphragm so that the container is able to stand upright in this configuration without the diaphragm standing on a bearing plane, thereby making transport and handling (particularly for the filling and the inversion that will follow) easier.

Also known are containers in which, prior to inversion, the diaphragm (or at least part thereof) protrudes beneath the plane of the standing ring. Such methods entail additional means for transporting the container prior to inversion.

Whatever the type of diaphragm, after filling and sealing, the diaphragm is pushed up toward the inside using a suitable device, so as to invert it, so that at the end of this operation it has the form of an arch, the convex side of which faces toward the inside of the container.

The device is made up of:

- on the one hand, a lower support plate, also referred to as saddle, which is annular and fixed with respect to a chassis of the device, which saddle has a central orifice passing through it and comprises a receiving plane surrounding said orifice to receive the standing ring of the container;
- on the other hand, a pusher, which can be actuated by drive means, is arranged under the bottom of the container and is mobile, in a vertical direction, through the orifice formed in the saddle, and has an exterior shape which may substantially correspond to the shape of the diaphragm after inversion;
- and finally, an upper bearing piece, which piece is fixed to the end of an upper connecting block that can be moved vertically with respect to the saddle between a raised position that allows the container to be inserted in the device and a lowered position in which the container is held during inversion.

Before inversion, the standing ring of the container is stood on the annular plate and the pusher is in a retracted position, so that no part of the pusher is in contact with the diaphragm. At this stage, it should be noted that, when the container has a diaphragm which, prior to inversion, completely or partially extends beneath the plane of the standing ring, the aforementioned central orifice in the saddle is dimensioned so that it allows the entirety of the protruding region of the diaphragm to pass through the orifice so that the standing ring, which therefore surrounds the diaphragm, is stood on the saddle.

The connecting block is then brought into a lowered position so that the bearing piece is positioned above the container in fixed contact with an upper part thereof (such as the neck). When the pusher is actuated, it moves up toward the diaphragm then pushes it back through the orifice in the plate as far as a final position of inversion. As the bearing piece is holding the container at the top, the diaphragm inverts under the effect of the antagonistic forces between the pusher and the bearing piece, so that the diaphragm adopts its arched shape.

The inversion, because it occurs after sealing, leads to a reduction in the internal volume of the container, and this brings about an immediate overpressure inside the container with the effect of making the walls go rigid. As the liquid cools, the volume of air remaining in the container contracts and the liquid shrinks so that the rigidity of the container decreases, but not enough for the user to have the impression of being in possession of a container that is "soft" at the time of purchase or up to the first time of opening.

The use of such a container with a diaphragm is not restricted to filling with hot liquids. Specifically, insofar as these containers are lighter in weight than containers with pressure panels, they are naturally more flexible than the latter containers. However, because the inversion gives rise to a reduction, after sealing, in the internal volume of the container and to an overpressure inside the container with a rigidification of the walls, it is entirely conceivable to use this type of container with liquids that are introduced at ambient temperature. At the time of purchase, the user will not be disconcerted when making contact with the container, because the latter will appear to the user to be rigid.

Recently, it has been discovered that, at the time of inversion, the container is subjected to antagonistic forces which appear, along its vertical axis, between the assembly consisting of the saddle and the pusher, on the one hand, and the bearing piece on the other hand. However, once the pusher has returned to its retracted position, it can happen that the pressure in the container is too great and the diaphragm collapses, or in other words seeks to return to its initial position, because there is no other portion of the container able to compensate for the overpressure. The inversion would then not necessarily be irreversible.

In order to overcome the disadvantages of this solution, there has been conceived the idea of relieving the stresses applied to the container by connecting the bearing piece to means that are controlled in such a way as to move it away from the saddle (such as a mechanism involving a cam and a driving roller for the bearing piece when the device is borne by a chassis formed by a rotary carrousel), while causing the bearing piece to move up slightly so as to distance it from the top of the container, before bringing the pusher back down. Such a separation action means that the internal pressure that increases as the pusher pushes the diaphragm up has a tendency to cause the container to lengthen: in fact, under the effect of the internal pressure, some of the peripheral ribs of the body of the container deform in the manner of a bellows, and the container therefore lengthens, thereby bringing about an increase in its internal volume and a drop in the pressure to such a point that the forces due to the internal pressure balance with the resistive forces of the body of the container.

However, such a device is not entirely satisfactory, for various reasons, particularly the fact that when the bearing piece is distanced, the container simply finds itself standing on the saddle and on the pusher as long as the latter has not been begun its movement back down toward its retracted position; it is only stood on the saddle after the pusher has begun to move back down toward its retracted position. The container is therefore no longer held in a stable fashion, and that means that it is impossible to proceed with any other handling operation, particularly when the container is manufactured or handled on a carrousel of a rotary machine because, if it were, there is a risk that the centrifugal force would cause the container to be ejected when it is simply stood on the saddle.

This is why, more recently, alternative solutions have been proposed, in which certain bearing stresses are relaxed while allowing the standing ring to be distanced from the upper plane of the saddle while the pusher is inverting the diaphragm, so that a space is created between the standing ring and the saddle to allow the container to expand longitudinally under the combined effect of the increase in the internal pressure brought about by the reduction in volume due to the inversion, and of the forces generated inside the container by the pusher and the bearing piece. The container is therefore always guided at two points and, thus, can remain stable in the inversion workstation: for example, it is guided between the saddle and the bearing piece before and after inversion, and then between the pusher and the bearing piece during inversion.

A first alternative solution envisioned consists in an inversion device wherein there are provided, on the one hand, a fixed member in the form of a pusher arranged beneath the bottom of the container and, on the other hand, a support saddle able to move vertically with respect to a chassis of the device, which saddle has passing through it a central orifice that allows the passage of the pusher and comprises a receiving plane surrounding said orifice to receive the standing ring of the container and, finally, a mobile member in the form of a mobile upper bearing piece that can be actuated by drive means and is fixed to the end of an upper connecting block. The bearing piece can be moved vertically with respect to the saddle between a raised position that allows the container to be introduced into the device and a lowered position allowing inversion. It is therefore the antagonistic forces between the (mobile) bearing piece and the (fixed) pusher that bring about the inversion. That device does however have the disadvantage of requiring the saddle to be lowered independently of the bearing piece, so as to free the standing ring of the container, while the inversion force is transmitted by the drive means of the bearing piece which, as it lowers, compresses the container between this member and the pusher, and to cause the diaphragm to be pushed up. This solution does not provide a checking step for verifying that the inversion is correct.

A second solution is to provide a fixed member, in the form of a bearing piece which remains fixed during inversion (this bearing piece however possibly being able to be raised so as to allow the container to be introduced beforehand), a mobile member in the form of a mobile pusher, arranged underneath and able to be actuated by drive means, and, finally, a support saddle, able to move vertically with respect to a chassis of the device, through which saddle there passes a central orifice allowing the passage of the pusher and which saddle comprises a receiving plane surrounding said orifice to receive the standing ring of the container. During inversion, the pusher is raised while the saddle is lowered so as to allow the standing ring to be released as the diaphragm forms. The lowering of the saddle per se has drawbacks: specifically, the level of the upper surface of the saddle, and therefore the surface for receiving the containers, is often a reference on the conveying lines and it is therefore useful and preferable to keep this level fixed, so that it is the same as that of the receiving surfaces of the conveyors and other items of equipment that make up the manufacturing line.

A third alternative solution, allowing the release of stress, is the subject matter of French patent application 17 62739 in the name of the Applicant Company, as yet unpublished. In that application, there is provided a mobile member, in the form of a mobile pusher, which passes through a fixed saddle and a bearing piece that is able to move vertically over a predetermined short distance so that when the pusher is raised, it pushes the container upward, and this container itself drives the bearing piece upward, thereby distancing the standing ring from the saddle, allowing the container to expand longitudinally. The presence of a fixed saddle makes the handling of the container before, during and after inversion easier.

In that application, a sequence for checking the correct inversion of the diaphragm is also provided, this being done by implementing an operation for determining the height of the arch after inversion of the diaphragm. This operation is conducted, after inversion and return of the pusher to its initial position, by pressing the container firmly onto the saddle (for which purpose, means press down on the shoulder of the container or on the cap itself) and by bringing about a further (upward) movement of the pusher until it comes into abutment against the arch and by determining its position at the moment at which it comes into abutment. To do this, means (which will not be fully explained again here because acquaintance therewith is not necessary for understanding the present invention) are employed so that the movement of the pusher stops when it reaches the position of abutment. Depending on whether or not the value of the travel of the pusher until such point as it comes into abutment with the arch is acceptable, the diaphragm is considered to be either correctly or not correctly inverted. Depending on the result of the check, the container can be extracted from the batch (in the event of incorrect inversion) or continue with the packaging process.

While the checking sequence works in most instances, it sometimes happens that, in certain particular cases, it cannot be applied. Indeed, during the checking phase, it is necessary to apply to the pusher a force of between 100 N and 200 N. When the pusher comes into contact with the arch, this force is transmitted in its entirety longitudinally to the container. Now, because this container is pressed firmly against the saddle, the force transmitted amounts to the application of a vertical load of 10 kg to 20 kg to the container. Now, it happens that certain containers have little or no ability to withstand the application of such a vertical load, and carry the risk of deforming by crushing. Such is the case for example with small capacities; and may also be the case with very lightweight containers.

SUMMARY OF THE INVENTION

It is an object of the invention to overcome this disadvantage by proposing a method for checking the correct inversion of a diaphragm, which is applicable to containers obtained by the implementation of methods whereby the stresses applied to the container are relaxed during the diaphragm inversion phase, therefore the methods summarized hereinabove, including the method that is the subject of the aforementioned French patent application 17 62739.

Tests have revealed that, in most cases, during the inversion phase, upward of a certain amplitude of movement of the diaphragm under the effect of the antagonistic forces applied between the fixed member and the mobile member as these members move closer to one another, the diaphragm inversion movement accelerates sharply and the diaphragm adopts its final shape by turning inside out very quickly. In other words, the forces exerted on the diaphragm as a result of the closing of the relative distance between the pushing member and the pusher give rise to an impulse which initiates the inversion of the diaphragm which continues to form by spontaneously inverting itself without any further stress being applied to it. It may thus be appreciated that the rate of turning of the diaphragm comes to exceed the relative rate at which the distance between the fixed member and the mobile member is closed. The diaphragm can in some way be likened to a bistable membrane. The phenomenon is comparable with what happens when a curved surface (such as a sheet metal surface) experiences an impact on its convex side and sees its curvature invert under the effect of the shock (indenting phenomenon) without the member that caused the shock necessarily accompanying the entirety of the deformation movement.

It has been found that, at the moment at which the inversion movement accelerates, the diaphragm may suddenly distance itself from the pusher for a brief moment and/or the top part of the container which is in contact with the bearing piece may suddenly distance itself therefrom. In any event, for the period for which the diaphragm is moving quickly, the thrust exerted by the members involved in the inversion (the pusher or the bearing piece) becomes lower. This is the result of the fact that the mobile member is designed to move at a constant speed with respect to the fixed member so that, at the moment of the inversion acceleration, the diaphragm moves more quickly than the members that are moving closer toward one another, causing a kind of sudden jumping of the container with respect to the fixed member and/or to the mobile member and may generate vibrations in the inversion device. Next, the mobile member, whether this is the pusher or the bearing piece, which is programmed to cover a travel of a given amplitude, then continues in its travel until this amplitude is reached, so that, at the end, the pusher and the bearing piece are once again back in contact with the container, which is to say that, at the end of the inversion process, the diaphragm comes back into contact with the pusher and the top part of the container is in contact with the bearing piece.

Additional tests have demonstrated that all of the arches obtained without the diaphragm inversion movement accelerating suddenly, are incorrectly formed. Such arches have a tendency to collapse when the mobile member is returned to its original position. By contrast, it has been found that all of the arches obtained after the diaphragm has turned itself inside out quickly (which is to say after having experienced the impulse brought about by the relative closing of the distance between the pusher and the bearing piece and after having completed its inversion of its own accord) are correctly formed and maintain their shape after removal of the mobile member.

The fact that the diaphragm does not distance itself from the pusher and/or that the top part of the container does not distance itself from the bearing piece can be explained as being a consequence of the stresses resulting from poor injection of the preform used to manufacture the container or else poor thermal conditioning of the preform prior to the formation of the container or else poor control over the container blow-molding parameters. By contrast, when the diaphragm completes its inversion of its own accord, this is a sign that the material of which the diaphragm, and ultimately of which the arch, is made is sufficiently relaxed that it is able to adopt its final position of its own accord.

The invention consists in taking advantage of this phenomenon.

According to the invention, a method for forming, in an inversion device, a base of a filled and sealed plastic container, said method comprising a step of inverting a diaphragm situated at the center of the base of the container and surrounded by a standing ring forming a standing surface, during which step, two opposing pushing members are set in relative motion with respect to one another so as to come into contact with and press on two longitudinally opposed regions of the container, namely, on the one hand, a pusher, arranged below a region situated in the bottom part of the container facing the diaphragm so as to push this up toward the top of the container and, on the other hand, an upper bearing piece that comes to bear against a region of the container that is situated in the top part of the container, on the opposite side of the diaphragm, so as to counter the forces of the pushing-up of the diaphragm, while the standing ring is free of any stress so as to allow a longitudinal expansion of the container under the effect of the internal pressure brought about by the movement of the diaphragm when it is driven toward the top of the container;

is a method wherein, during a phase of pushing the diaphragm during the inversion thereof, there is sought, on a curve representative of the force applied to the diaphragm to move same during the inversion, a variation on this curve that indicates whether the forces applied by the pushing members to the regions with which they are in contact are becoming smaller, as this indicates a spontaneous acceleration of the rate of inversion of the diaphragm and an appreciable separation of at least one region of the container from the respective pushing member.

The invention is particularly advantageous because it makes it possible, at the very moment of inversion, to determine whether or not the diaphragm will be correctly inverted, insofar as the very fact that the forces decrease while a region is distancing itself from its respective pusher is enough to declare that the inversion will be correct.

According to other features, considered alone or in combination:

- the relative motion of the two members is obtained by moving at least one of the two pushing members using actuating means and the curve representative of the force applied to the diaphragm in order to move same during inversion, on which said variation is sought, is a curve representative of the force applied to the actuating means and, therefore, to the diaphragm, in order to move same, and the variation sought on said curve is representative of a decrease in said applied force;
- with the actuating means that actuate a pushing member consisting of an electric motor, the curve representative of the force applied to said member in order to move same is a curve of the drive current of said motor and the determination of the reduction in the force applied by at least one of the pushing members with respect to the region of the container with which it is in contact is performed by seeking, on said curve of the drive current of said at least one moved member, a variation that consists in a reduction in the current representative of the reduction in the forces needed to drive said at least one pushing member.

Specifically, when one or both pushing member(s) is (are) exerting a lower force on the region of the container with which each was initially in contact, the force necessary to obtain the relative movement between the two members reduces abruptly because no further pressure is being applied to the diaphragm for a brief moment. Thus, whether the relative movement between the two members is brought about by the movement of just one or of both members, the drive current of each member moved reduces at the moment that the acceleration of the inversion occurs, and a simple measurement of the drive current of the member moved (when just one member is moved) or of at least just one of the two (when both are moved) allows this occurrence to be determined. Indeed, just one is enough because if an acceleration in the inversion occurs, the drive current of both the members decreases when both are activated; as a preference, when both of the members are moved, the search is performed on the drive current of the pusher.

According to other features:

- the curve representative of the force applied to the diaphragm in order to move same during the inversion, on which said variation is sought, is a curve of acoustic measurements representative of the noise surrounding the base of the container during the inversion of the diaphragm and what is sought on this curve is a variation in the sound indicative of the appearance of a sound signifying a shock that occurs when a pushing member which has previously suddenly become appreciably distanced from the region of the container with which it was in contact comes back into contact with said region;
- the curve representative of the force applied to the diaphragm in order to move same during the inversion, on which said variation is sought, is a curve measuring vibrations representative of the vibrations surrounding the base of the container at the time of inversion of the diaphragm, and what is sought on this curve is a variation indicative of the appearance of accentuated vibrations which occur in the inversion device when the diaphragm suddenly inverts as a result of the relaxation of the forces of the pushing members;
- the measurement of the vibrations is performed using sensors arranged at locations of the inversion device that are liable to be subjected to these vibrations, particularly on the pushing members and the actuating means;
- the curve representative of the force applied to the diaphragm in order to move same during the inversion, on which said variation is sought, is a curve of optical measurements of the distance between each pushing member and the region of the container with which it is initially in contact, and what is sought on this curve is a variation consisting in an increase in said distance indicative of the appearance of at least a separation between a pushing member and the region of the container with which it was initially in contact during an instant in the diaphragm inversion phase;
- the optical measurement is performed using means arranged at the periphery of the container;
- the curve representative of the force applied to the diaphragm in order to move same during the inversion, on which said variation is sought, is a curve of measurements of the presence of contact between each pushing member and the region of the container with which it was initially in contact, and what is sought on this curve is a variation consisting in the determination of a loss of contact between at least one pushing member and the region of the container with which it was initially in contact during an instant in the diaphragm inversion phase;

the loss of contact between a pushing member and the region of the container with which it was initially in contact is determined using a contact sensor arranged on said pushing member;

Another subject of the invention is a device for implementing the method, whereby:

the device comprises a first pushing member consisting of a mobile pusher able to move in a vertical direction relative, on the one hand, to a second pushing member consisting of an upper bearing piece and, on the other hand, to a saddle, which is provided with a central orifice and constitutes an annular receiving plane able to receive the standing ring of a container before and after the phase of inverting the diaphragm thereof, and it is designed so that the saddle is away from the standing ring of the container during the inversion phase so that, during this phase, a space is created between the standing ring and the saddle so as to allow longitudinal expansion of the container under the combined effect of the increase in internal pressure brought about by the reduction in volume due to the inversion and of the forces generated inside the container by the pusher and the bearing piece;

the device comprises a chassis and the pusher is able to move through the saddle and the upper bearing piece is fixed with respect to said chassis;

the device comprises a chassis and the pusher can be actuated by drive means through the saddle, the saddle is fixed with respect to the chassis, and the upper bearing piece is fixed to the end of an upper connecting block which can be moved vertically with respect to the saddle between a raised position that allows the container to be inserted into the device and a lowered position in which it is kept during inversion, and the upper bearing piece is connected with the ability to move relative to the block by being connected thereto via connecting means that are elastic in compression;

the device comprises a chassis, the pusher is a fixed element arranged under the base of the container, the saddle is able to move vertically with respect to said chassis so as to be able to be distanced from the standing ring of the container during inversion and thus allow longitudinal expansion of the container, the upper bearing piece can be actuated by drive means;

the pusher is able to move through the saddle with respect to a chassis of the device, and the upper bearing piece is able to move with respect to said chassis of the device.

BRIEF DESCRIPTION OF THE FIGURES

Further features and advantages of the invention will become apparent from reading the following description, given with reference to the attached figures, in which:

FIG. 1 is a schematic view illustrating a device in which the invention can be implemented and the various components thereof, while a container is in position on the saddle, prior to initiation of the inversion step. This view comprises an inset with an enlarged detail of the upper support piece;

FIG. 2 is a schematic view illustrating the device while the pusher is in an intermediate position and the inversion of the diaphragm is in progress;

FIG. 3 is a schematic view illustrating the device after inversion, and after the pusher has returned to the lowered position;

FIG. 4 is a view representative of the curve of drive current of a mobile member (pusher or upper bearing piece) in the case of a diaphragm that is incorrectly inverted;

FIG. 5 is a view representative of the curve of drive current of a mobile member (pusher or upper bearing piece) in the case of a diaphragm that is correctly inverted.

DETAILED DESCRIPTION

FIG. 1 repeats, by way of illustration, a view of the device described in the aforementioned French patent application 17 62739 in the name of the Applicant Company.

As will have been understood from reading the preamble of the present description, other devices may be used.

This device 1 allows the inversion of diaphragms of containers 2 such as bottles.

Such containers 2, like the one illustrated, comprise a body 3, in this instance cylindrical, extended, at the top, from a shoulder 4 itself surmounted by a neck 5. In the continuation of the body 3 in the downward direction, the container 2 is provided with a base 6 comprising a diaphragm 7, in this instance of circular cross section, but which could have other shapes allowing it to be turned inside out, contained inside a ring 8 ending with a peripheral standing ring 9 forming a standing surface.

In FIG. 1, the container 2 is in the configuration it has after manufacture by blow-molding or stretch-blow-molding, and the diaphragm 7 is in the overall shape of a bowl with the concave side facing the inside of the container 2.

In the example, the container 2 is a cylinder of revolution and its body 3 is reinforced by horizontal ribs 10. Rather than being cylindrical, it could have a shape such as a shape that can be more or less inscribed inside a square (a container or bottle said to be in the shape of a "squircle") or any other cross section. However, in order to allow its inversion, the diaphragm would maintain a somewhat circular cross section. The external contour of the ring 8 would be designed to extend the shape of the body and blend into the standing ring 9.

The shoulder 4 of the container, for its part, is bubble shaped. It too could adopt any known shape (frustoconical, flute shaped, etc.).

The device 1 is designed to invert the diaphragms 7 of filled and capped containers. Hence, the container 2 is depicted with capping means 11, such as a cap screwed onto the neck 5.

As illustrated in the figures, the device 1 is supported by a chassis 12 (partially depicted) and comprises a lower support saddle 13, which is fixed with respect to said chassis 12 (the connection between the saddle 13 and the chassis 12 is not depicted but is within the competence of the person skilled in the art), through which saddle 13 there passes a central orifice 14 and which saddle delimits an upper receiving plane 15, surrounding said orifice 14, to receive the standing ring 9 of a container.

A pusher 16, which constitutes a mobile pushing member, is provided and is able to be moved, through the central orifice 14 of the saddle 13 in a vertical direction, by drive means (not depicted) secured to the chassis 12 and to the pusher 16 but comprising, for example, an electric motor. The drive means allow the pusher 16 to be able to be moved from a retracted position (that of FIG. 1) in which it lies for example entirely below the upper plane 15 of the saddle 13, into a final position of inversion (not visible in the figures, but which lies above the position of FIG. 2), in which it is above the upper plane 15 of the saddle 13.

The pusher 16 has an exterior shape which preferably corresponds to the shape of the diaphragm 7 after inversion. However, the pusher 16 could be less elaborate: for example, it could be a rod designed to push against the center of the diaphragm.

The device 1 further comprises an upper bearing piece 17 which constitutes a fixed pushing member. As will be explained in greater detail, this bearing piece 17 is intended to come to bear against the capped container 2 when the latter is in place on the saddle 13 and thus counter the force of the pusher 16 when the latter is moved toward the inversion position.

In the example, the bearing piece 17 consists of a bell-shaped piece which fits over the capping means 11 (and therefore the neck 5 of the container) and comes to bear on a region of the shoulder 4 slightly below the neck 5. Instead of consisting of a bell pressing against the shoulder, the bearing piece 17 could consist of a piece simply bearing against the capping means 11. However, the bell is more advantageous insofar as it generates less stress on the container 2 because pressure on the capping means 11 leads to pressure at the junction between the neck 5 and the shoulder 4, which is a region of small cross section which has undergone no stretching and is therefore weak, whereas the bell presses over a larger cross section so that the bearing pressure is lower (for an equivalent force applied).

The bearing piece 17 preferably presses over the entire circumference of the shoulder. However, it must be noted that it could have part of its wall cut away, so as to clear the bottle during the phase of loading onto/unloading from the saddle 13 and thus limit the amount of travel that the block 18 needs to cover when the device 1 is borne by a carrousel or is able to move with respect to a container 2 loading region and/or unloading region.

The bearing piece 17 is fixed to an end, situated facing the saddle 13 and the pusher 16, of a connecting block 18 connected to the chassis 12 by a translatable connection allowing the block 18 to be moved vertically with respect to the saddle between a raised position allowing the container to be introduced into the device and a lowered position in which the block 18 is held during inversion.

As visible in the figures, particularly FIG. 1, the block 18 is fixed to the end of a shaft 19 mounted with the ability to slide in the vertical direction in a sleeve 20 borne by the chassis 12. Thus, the block 18 can be moved closer toward or further away from the saddle 13.

The shaft 19 and therefore the block 18 are connected to a mechanism which allows a raising and lowering movement of the shaft 19 and of the block 18 and allows the shaft 19 and the block 18 to be held firmly in the lowered position during inversion and checking. The various figures illustrate the block 18 in the lowered position in which it is firmly held during inversion.

The mechanism that allows said raising and lowering movement of the assembly consisting of the shaft 19 and the block 18 is, for example, a mechanism involving a cam and a roller. Only a roller 21 is depicted in the figures. The mechanism may comprise, above the roller 21, a first cam, known as the top cam and, underneath, a second cam (also known as bottom cam or counter cam). The two cams serve to guide the roller 21 for raising or lowering the assembly consisting of the shaft 19 and the block 18, the top cam pressing against the roller and preventing the assembly consisting of the shaft 19 and the block 18 from moving up when upward pressure is applied under the bearing piece 17.

It would also be conceivable to have a mechanism comprising only a top cam, a roller and a raising spring applying a force antagonistic to that of the top cam. It would also be conceivable to have a motorized mechanism for raising or lowering the assembly consisting of the shaft 19 and the block 18, and this would make it easier for the device to be customized to take account of the variations in height of the containers from one production phase to another.

The bearing piece 17 is connected in a mobile manner to the block 18 via connecting means that are elastic in compression. These are arranged in such a way that said member is itself capable of translational movement with respect to the block 18 in a direction perpendicular to the plane of the saddle and so that, in the absence of a container between the saddle 13 and the bearing piece 17, the latter is in a first, lowered, extreme position relative to the block 18 and so that, when a pressure higher than the minimum return force of the connecting means that are elastic in compression is applied upward against this piece 17, it moves up toward a second, raised, extreme position, distancing itself from the saddle 13.

To that end, the connecting means that are elastic in compression and visible in the inset of FIG. 1, are arranged as described hereinafter.

The block 18 is hollowed, at its opposite end from the shaft 19, with a housing 22 oriented along the axis X-X of the installation 1, namely an axis which passes through the center of the central orifice 14 of the saddle 13 which coincides with that of the shaft 19, of the pusher 16, of the bearing piece 17 and of the block 18 itself. The housing therefore opens toward the bearing piece 17. The bearing piece 17 is fixed, at its upper part, for example by screw-fastening, to a rod 23 which ends, at its opposite end to the bearing piece 17, in an annular crown 24 forming a flat head surrounding this end.

The part of the rod 23 that is situated between the crown 24 and the bearing piece 17 is positioned inside a sheath 25 in which it can slide freely. The length of this part of the rod 23 is therefore greater than the length of the sheath 25, leaving space for a spring 26 that works in compression to be positioned around the rod 23 between the pushing member and the sheath 25. Considering the orientation of the figures, in which the bearing piece 17 is arranged below the sheath 25, the spring 26 is therefore positioned above the bearing piece 17 and below the sheath 25. Thus, in the absence of upward pressure (when considering the orientation of FIG. 1) against the bearing piece 17, as visible in the inset, the spring 26 tends to keep this bearing piece 17 in a distanced position with respect to the sheath 25 (by pushing it downward, still when considering the orientation of the figure) and the crown 24 is therefore in abutment above the sheath 25. It is important to note that the dimensions of the rod 23, of the sheath 25 and of the spring 26 are such that they allow an upward movement of the bearing piece 17 when pressure is exerted under said piece.

The sheath 25 is push-fitted into the housing 22 so that the crown 24 and therefore the upper end of the rod 23 are placed inside the housing 22. Furthermore, the sheath 25 and the housing 22 are arranged so that when the sheath 25 is in place, there is still a separation between the upper end of the rod 23 and the upper wall 27 of the housing 22, so as to allow the rod 23 to slide freely in the sheath 25 when the bearing piece 17 is urged upward.

The dimensions of the rod 23, of the sheath 25 and of the spring 26 are such that, in the absence of upward force against the bearing piece 17, the separation between the top of the bearing piece 17 and the bottom of the sheath 25 allows the bearing piece 17 an upward movement over a predetermined maximum distance d when upward pressure is applied to the bearing piece 17.

Thus, in the absence of upward force against the bearing piece 17, the latter is in a first, lowered, extreme position relative to the block 18. When urged upward, the upward movement stops when the bearing piece 17 comes into contact with the sheath 25, or, in other words, when the bearing piece 17 has covered the maximum distance d.

In that case, the separation between the upper end of the rod 23 and the upper wall 27 of the housing 22 is such that it is at least equal to the maximum distance d so as to allow the bearing piece 17 to move relative to the block 18.

In a variant, it is the separation between the upper end of the rod 23 and the upper wall 27 of the housing 22 which determines the maximum distance d of the rod 23, the upper wall 27 then constituting an end stop to halt the rod. In that case, the value of the separation corresponds to the distance d.

As a preference, as illustrated, in the figures and more particularly in the inset of FIG. 1, means, such as a finger 28, are provided to prevent any rotation in the block 18 of the assembly consisting of the bearing piece 17 and of the rod 23. To this end, the finger 28 is fixed for example by screwing into a screw thread 29 formed in the upper wall 27 of the housing 22 and the finger 28 passes through a hole formed in the crown 24, thereby preventing any rotation, but not preventing any vertical movement of the assembly in question.

As an idea of scale, the magnitude of the separation between the top of the bearing piece 17 and the bottom of the sheath 25 or, alternatively, the magnitude of the separation between the upper end of the rod 23 and the upper wall 27 of the housing 22 is such that the maximum distance d that the bearing piece 17 can cover is less than 10 mm, for example comprised between 3 mm and 8 mm. In one embodiment, for containers 2 consisting of 1-liter bottles, a travel over a distance d of 4 mm is appropriate. Adjusting means, not illustrated, are provided in the device so that when a container 2 of which the diaphragm 7 is to be inverted is in place on the saddle and the block 18 reaches the lowered position, the bearing piece 17 itself is able to come into contact with the container 2, without pressing thereon, or even to be slightly separated therefrom. Indeed, the device 1 needs to be adapted to take account of the dimensions of the container 2 being handled, particularly the height thereof. The adjustment can be performed for example by modifying the position of the roller 21 on the shaft 19 and/or by modifying the position of the cam (not illustrated) that collaborates with the roller 21.

In the embodiment illustrated in FIG. 1 in which the bearing piece 17 is in the shape of a bell, following adjustment and lowering of the block 18 into the lowered position, the bearing piece 17 comes into contact with the shoulder 4 of the container 2 or is slightly separated therefrom. However, as mentioned previously, the arrangement could be one that bears against the container capping means.

The way in which this device operates is as follows:

Before inversion, a previously filled and capped container 2 is placed on the saddle 13 while the bearing piece 17 is raised sufficiently high up that it does not interfere with the cap 11. The raising of the bearing piece 17 is performed by raising the assembly consisting of the shaft 19 and the block 18 to which it is mechanically connected by the rod 23 and the sheath 25. The bearing piece 17 is then lowered back down to come into contact with the container 2, in this instance in contact with the shoulder 4, without pressing down on it at this stage for the low tolerance on the height of the container 2. The differences in height of the container 2 which can be attributed to the manufacture process prior to inversion will then be compensated for by part of the ability to move vertically of the bearing piece 17, through the partial compression of the spring 26.

The raising of the pusher 16 is then initiated, applying the inversion force thereto. Because the container 2 is filled and sealed, it has a certain mechanical rigidity. This, added to the fact that the structure of the installation is such that the inversion force is greater than the force exerted by the spring 26 on the bearing piece 17, means that the rising of the pusher 16 causes the container 2 to move up, its standing ring 9 moving away from the saddle 13 by rising above the upper plane 15 thereof, and the container 2 itself pushes the bearing piece 17 upward until the maximum distance d has been covered. The result of this is that the standing ring 9 moves away from the upper plane 15. During this upward movement of the bearing piece 17, inversion of the diaphragm 7 can begin as too may the lengthening of the container 2, so that when the bearing piece 17 reaches its raised position, the standing ring 9 may be separated from the upper plane 15 of the saddle by a distance shorter than the distance d.

Then, FIG. 2, when the bearing piece 17 has covered the maximum distance d, the standing ring 9 is distanced from the upper plane 15 of the saddle 13, at a distance from this plane. The magnitude of this distance may correspond to that of the maximum distance d or may be smaller, insofar as, during the initial rise, the inversion, which is mentioned hereinafter, and likewise the elongation of the container 2 may have begun so that when the bearing piece 17 reaches its raised position, the standing ring 9 may be separated from the upper plane 15 of the saddle by a distance smaller than the distance d. In that way, the bearing piece 17 is in contact with the block 18 and the residual value $d_{res}$ of the distance is zero. Next, the pusher 16 continues to rise to invert the diaphragm 7 (or finish the inversion if it began earlier on in the upward movement of the pusher 16). The following phenomenon then occurs. The deforming of the diaphragm 7 toward the inside of the container 2 brings about an increase in the internal pressure in the container 2, which is first of all compensated for by a compression and thus a reduction in the volume of air remaining in the neck (the head space) of the container, the liquid contained in the container 2 maintaining its volume, because of its incompressibility. When the air is completely compressed, the forces generated by the pusher 16 and the bearing piece 17 inside the container 2 become such that the container 2 experiences internal stresses which have a tendency to push out on its walls. Now, the separation brought about by the rising of the pusher 16 between the standing ring 9 and the upper plane 15 of the saddle 13 allows a stress region to be released and the forces generated, which have a tendency to push out on the walls, cause longitudinal expansion of the container 2 so that, at the end of inversion, the standing ring 9 has moved closer to the upper plane 15 of the saddle 13 whereas the bearing piece 17 is still in the raised position.

The pusher 16 then continues its travel until the diaphragm 7 reaches its final position, visible in FIG. 3.

It is generally when the diaphragm 7 reaches the position of FIG. 2 that, normally, it spontaneously accelerates its inversion movement and reaches its final position of inversion while the pusher 16 continues its travel without, however, exerting a pressure against the diaphragm 7, until the container 2 finds itself once again sandwiched between the pusher 16 and the bearing piece 17. If this phenomenon occurs, then the container 2 is considered to be correctly formed; if not, namely when the diaphragm is formed only by the pushing, without the spontaneous acceleration, then in this instance, although the diaphragm 7 may appear to have been correctly formed, there is nevertheless a high risk that the container will not be able to withstand the stresses of use.

The pusher 16 is driven by means not depicted, such as an electric motor. It will be readily appreciated that, when the diaphragm 7 begins to turn inside out on itself rapidly, the applied thrust becomes lower and the diaphragm 7 moves away from the pusher 16 or the shoulder 4 moves away from the bearing piece 17. Then, as the pusher 16 continues its travel, it comes back into contact with the diaphragm and the thrust becomes normal again until the end of the travel and the return downward movement of the pusher.

In such an instance in which the drive means that drive the pusher 16 are an electric motor, the curve of the drive current of said motor constitutes a curve representative of the force applied to the diaphragm 7 to move it and the determination of the reduction in the force applied by the pusher to the region of the container with which it is in contact is performed by seeking, on said curve of pusher drive current, a variation consisting in a reduction in the current, which is representative of the reduction in the forces needed to drive it. Thus, monitoring the drive current of the pusher 16 can be put to use during the inversion phase in order to determine whether the diaphragm 7 is turning inside out rapidly. This is illustrated in FIG. 4 and FIG. 5.

FIG. 4 depicts a curve Cdep of displacement of the drive member of the pusher 16 in correspondence with the curve Ceff of the drive current of the pusher 16, in the case where the inversion of the diaphragm 7 does not include a phase of spontaneous acceleration. The current increases following a relatively even curve as far as the end of the pushing movement, and then drops back down again as the pusher 16 is lowered back down.

FIG. 5 depicts a curve of displacement Cdep of the drive member of the pusher in correspondence with the curve Ceff of the drive current of the pusher 16, in the case where the inversion of the diaphragm 7 comprises a spontaneous-distancing phase when the pusher 16 has not reached its extreme raised position. The current increases following a relatively even curve and then, while the pusher 16 has not reached its extreme position, there comes the spontaneous acceleration in the inversion of the diaphragm 7 with a corresponding variation Var in the form of a drop in the drive current of the pusher 16. This drop occurs because the diaphragm 7 has distanced itself from the pusher 16 and/or because the shoulder 4 has distanced itself from the bearing piece 17. Thereafter, the pusher 16 and the bearing piece 17 come back into nominal contact and the drive current of the pusher 16 becomes normal again: it starts to increase again until the pusher reaches the raised position, and then drops back down again when the pusher 16 is lowered back down.

It should be noted that the means of actuating a pushing member could be other than an electric motor, in which case an appropriate sensor would be employed in order to obtain a curve representative of the force applied to said member in order to move same.

Instead of using the device of FIGS. 1 to 3, the invention could be implemented with the other types of device mentioned in the preamble.

Thus, instead of a mobile pusher 16, it is the bearing piece 17 which could be mobile. In that case, it is the drive current of this bearing piece 17 that would be measured.

The pusher 16 and the bearing piece 17 could each be mobile. In that case, verification of the drive current of just one of these two members would be sufficient because, in the event of the inversion acceleration, the reduction in the thrusting forces would be experienced on both. As a preference, the verification is made using the curve of the driving current of the pusher, because it is the pusher that is in contact with the diaphragm.

Whatever the device employed, instead of measuring current, it is an acoustic measurement of the noise surrounding the base of the container during the inversion of the diaphragm that is measured: after the inversion acceleration when the pushing member or members (pusher 16 and/or bearing piece 17) return to the nominal position and, in fact, come back into contact with the diaphragm 16 and/or with the top of the container 2 (for example the shoulder 4), there comes a shock which can be picked by an appropriate sensor. It is therefore a noise curve that would be verified.

Alternatively, it is a curve of the vibrations that occur in the inversion device when the diaphragm inverts abruptly as a result of the relaxation of the forces of the pushing members that is analyzed. The search for vibrations is carried out using sensors arranged at locations of the inversion device that are liable to be subjected to these vibrations, particularly on the pushing members and their means of actuation. As a preference, when just one pushing member is activated, it is the vibrations of this member that are analyzed; when both members are activated, it is preferably the vibrations that occur on the pusher 16 that are analyzed.

The measurement may be performed on a curve representative of the distance between the pushing members and the respective regions of the container with which these members are in contact. This type of measurement entails checking each member.

In one implementation, it is a curve giving the signals from sensors arranged on the pushing members which provide a first type of signal when the members are in contact with their respective region and a second type of signal when they no longer are.

In a variant, it is a curve representative of an optical measurement: a sensor, such as a camera, is positioned at a suitable location close to each pushing member in order to determine the distancing or absence of distancing between each member and the respective region with which it is in contact.

The invention claimed is:

1. A method for forming, in an inversion device (1), a base (6) of a filled and sealed plastic container (2), comprising a step of inverting a diaphragm (7) situated at the center of the base (6) of the container (2) and surrounded by a peripheral standing ring (9) forming a standing surface, during which step, two opposing pushing members are set in relative motion with respect to one another so as to come into contact with and press on two longitudinally opposed regions of the container, namely, on the one hand, a pusher (16), arranged below a region situated in the bottom part of the container facing the diaphragm (7) so as to push this up toward the top of the container and, on the other hand, an upper bearing piece (17) that comes to bear against a region of the container that is situated in the top part of the container, on the opposite side of the diaphragm (7), so as to counter the forces of the pushing-up of the diaphragm, while the standing ring is free of any stress so as to allow a longitudinal expansion of the container under the effect of the internal pressure brought about by the movement of the diaphragm when it is driven toward the top of the container;

wherein, during a phase of pushing the diaphragm during the inversion thereof, there is sought, on a curve (Ceff) representative of the force applied to the diaphragm (7) to move same during the inversion, a variation (Var) on this curve defining an outlier that indicates whether the forces applied by the pushing members to the regions with which they are in contact are becoming smaller and thereby indicating a spontaneous acceleration of the rate of inversion of the diaphragm (7) and an appreciable separation of at least one region of the container from the respective pushing member.

2. The method as claimed in claim 1, wherein the relative motion of the two members is obtained by moving at least one of the two pushing members using actuating means and the curve (Ceff) representative of the force applied to the diaphragm (7) in order to move same during inversion, on which said variation (Var) is sought, is a curve (Ceff) representative of the force applied to the actuating means and, therefore, to the diaphragm, in order to move same, and the variation (Var) sought on said curve is representative of a decrease in said applied force.

3. The method as claimed in claim 2, wherein, with the actuating means that actuate a pushing member consisting of an electric motor, the curve (Ceff) representative of the force applied to said member in order to move same is a curve of the drive current of said motor and the determination of the reduction in the force applied by at least one of the pushing members with respect to the region of the container with which it is in contact is performed by seeking, on said curve (Ceff) of the drive current of said at least one moved member, a variation (Var) that consists in a reduction in the current representative of the reduction in the forces needed to drive said at least one pushing member.

4. The method as claimed in claim 3, wherein, with the two pushing members being moved, a search is performed indifferently on the curve (Ceff) of the drive current of one of the two members, preferably that of the pusher (16).

5. The method as claimed in claim 1, wherein the curve (Ceff) representative of the force applied to the diaphragm (7) in order to move same during the inversion, on which said variation (Var) is sought, is a curve (Ceff) of acoustic measurements representative of the noise surrounding the base of the container during the inversion of the diaphragm and what is sought on this curve is a variation (Var) in the sound indicative of the appearance of a sound signifying a shock that occurs when a pushing member which has previously suddenly become appreciably distanced from the region of the container with which it was in contact comes back into contact with said region.

6. The method as claimed in claim 1, wherein the curve (Ceff) representative of the force applied to the diaphragm (7) in order to move same during the inversion, on which said variation (Var) is sought, is a curve (Ceff) measuring vibrations representative of the vibrations surrounding the base of the container at the time of inversion of the diaphragm, and what is sought on this curve is a variation (Var) indicative of the appearance of accentuated vibrations which occur in the inversion device when the diaphragm suddenly inverts as a result of the relaxation of the forces of the pushing members.

7. The method as claimed in claim 6, wherein the measurement of the vibrations is performed using sensors arranged at locations of the inversion device that are liable to be subjected to these vibrations, particularly on the pushing members and the actuating means.

8. The method as claimed in claim 1, wherein the curve (Ceff) representative of the force applied to the diaphragm (7) in order to move same during the inversion, on which said variation (Var) is sought, is a curve (Ceff) of optical measurements of the distance between each pushing member and the region of the container with which it is initially in contact, and what is sought on this curve is a variation (Var) consisting in an increase in said distance indicative of the appearance of at least a separation between a pushing member and the region of the container with which it was initially in contact during an instant in the diaphragm inversion phase.

9. The method as claimed in claim 8, wherein the optical measurement is performed using means arranged at the periphery of the container.

10. The method as claimed in claim 1, wherein the curve (Ceff) representative of the force applied to the diaphragm (7) in order to move same during the inversion, on which said variation (Var) is sought, is a curve (Ceff) of measurements of the presence of contact between each pushing member and the region of the container with which it was initially in contact, and what is sought on this curve is a variation (Var) consisting in the determination of a loss of contact between at least one pushing member and the region of the container with which it was initially in contact during an instant in the diaphragm inversion phase.

11. The method as claimed in claim 10, wherein the loss of contact between a pushing member and the region of the container with which it was initially in contact is determined using a contact sensor arranged on said pushing member.

12. A device (1) for implementing the method as claimed in one of claims 1 through 11, wherein it comprises claim 1, further comprising a first pushing member consisting of a mobile pusher (16) able to move in a vertical direction relative, on the one hand, to a second pushing member consisting of an upper bearing piece (17) and, on the other hand, to a saddle (13), which is provided with a central orifice and constitutes an annular receiving plane able to receive the standing ring (9) of a container before and after the phase of inverting the diaphragm (7) thereof, and wherein it is designed so that the saddle (13) is away from the standing ring (9) of the container during the inversion phase so that, during this phase, a space is created between the standing ring (9) and the saddle (13) so as to allow longitudinal expansion of the container under the combined effect of the increase in internal pressure brought about by the reduction in volume due to the inversion and of the forces generated inside the container by the pusher (16) and the bearing piece (17).

13. The device (1) as claimed in claim 12, further comprising a chassis (12) and wherein the pusher (16) is able to move through the saddle (13) and the upper bearing piece (17) is fixed with respect to said chassis (12).

14. The device (1) as claimed in claim 12, further comprising a chassis (12) and wherein the pusher (16) can be actuated by drive means through the saddle (13), wherein the saddle (13) is fixed with respect to the chassis (12), and wherein the upper bearing piece (17) is fixed to the end of an upper connecting block (18) which can be moved vertically with respect to the saddle (13) between a raised position that allows the container (2) to be inserted into the device and a lowered position in which it is kept during inversion, and wherein the upper bearing piece (17) is connected with the ability to move relative to the block (18) by being connected thereto via connecting means that are elastic in compression.

15. The device as claimed in claim 12, further comprising a chassis (12) and wherein the pusher (16) is a fixed element arranged under the base of the container, the saddle (13) is able to move vertically with respect to said chassis (12) so as to be able to be distanced from the standing ring of the container (2) during inversion and thus allow longitudinal expansion of the container;

and wherein the upper bearing piece (17) can be actuated by drive means.

16. The device as claimed in claim 12, further comprising a chassis (12) and wherein the pusher (16) is able to move through the saddle (13) with respect to said chassis (12) and the upper bearing piece (17) is able to move with respect to said chassis (12).

17. A method for forming, in an inversion device (1), a base (6) of a filled and sealed plastic container (2), comprising a step of inverting a diaphragm (7) situated at the center of the base (6) of the container (2) and surrounded by a peripheral standing ring (9) forming a standing surface, during which step, two opposing pushing members are set in relative motion with respect to one another so as to come into contact with and press on two longitudinally opposed regions of the container, namely, on the one hand, a pusher (16), arranged below a region situated in the bottom part of the container facing the diaphragm (7) so as to push this up toward the top of the container and, on the other hand, an upper bearing piece (17) that comes to bear against a region of the container that is situated in the top part of the container, on the opposite side of the diaphragm (7), so as to counter the forces of the pushing-up of the diaphragm, while the standing ring is free of any stress so as to allow a longitudinal expansion of the container under the effect of the internal pressure brought about by the movement of the diaphragm when it is driven toward the top of the container;

wherein, during a phase of pushing the diaphragm during the inversion thereof, there is sought, on a curve (Ceff) representative of the force applied to the diaphragm (7) to move same during the inversion, a variation (Var) on this curve defining a brief disturbance along the curve (Ceff) which indicates whether the forces applied by the pushing members to the regions with which they are in contact are becoming smaller and thereby indicating a spontaneous acceleration of the rate of inversion of the diaphragm (7) and an appreciable separation of at least one region of the container from the respective pushing member.

* * * * *